No. 689,368.  
A. B. RUSH.  
ICE CREAM DISHER.  
(Application filed Aug. 27, 1901.)  
(No Model.)
Patented Dec. 17, 1901.
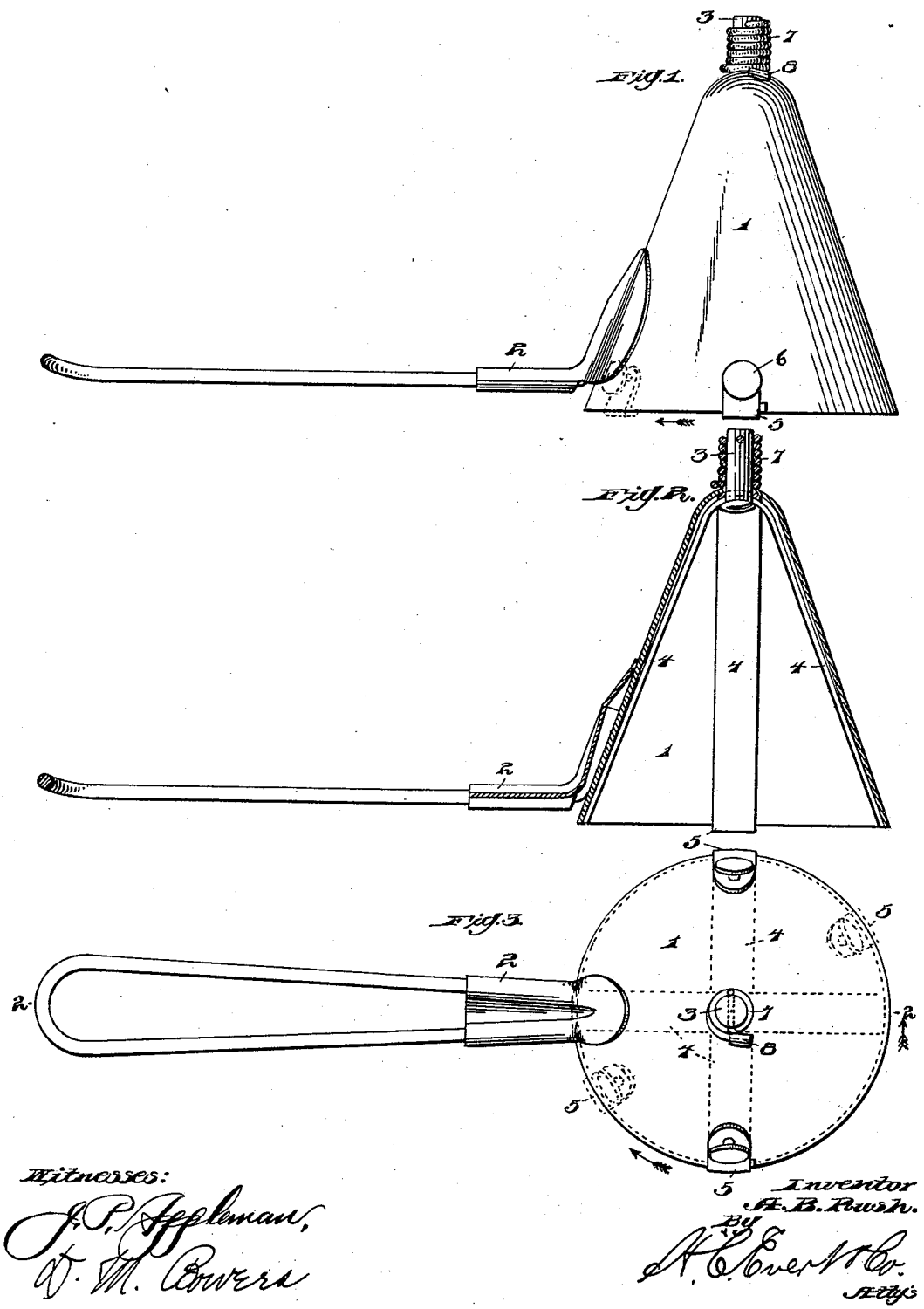

UNITED STATES PATENT OFFICE.

ARMINDA B. RUSH, OF PITTSBURG, PENNSYLVANIA, ASSIGNOR OF ONE-HALF TO KOSSUTH L. STEINER, OF PITTSBURG, PENNSYLVANIA.

ICE-CREAM DISHER.

SPECIFICATION forming part of Letters Patent No. 689,368, dated December 17, 1901.

Application filed August 27, 1901. Serial No. 73,485. (No model.)

*To all whom it may concern:*

Be it known that I, ARMINDA B. RUSH, a citizen of the United States of America, residing at Pittsburg, in the county of Allegheny and State of Pennsylvania, have invented certain new and useful Improvements in Ice-Cream Dishers, of which the following is a specification, reference being had therein to the accompanying drawings.

This invention relates to certain new and useful improvements in ice-cream dishers, and relates more particularly to that class that can be conveniently operated with one hand.

The invention has for its object the provision of novel means whereby frozen cream, ices, puddings, and the like may be easily disengaged from the mold and served.

Another object of the invention is to construct a device of the above-described character that will be extremely simple in construction, strong, durable, and comparatively inexpensive to manufacture.

With the above and other objects in view the invention consists in the novel combination and arrangement of parts to be hereinafter more fully described, and specifically pointed out in the claims.

In describing the invention in detail reference is had to the accompanying drawings, forming a part of this specification and wherein like numerals of reference indicate corresponding parts throughout the several views, in which—

Figure 1 is a side elevation of my improved cream-disher. Fig. 2 is a vertical sectional view of the same. Fig. 3 is a top plan view thereof.

In the drawings the reference-numeral 1 indicates the mold, which is preferably cone-shaped, said mold having attached thereto a rigid handle 2. Through the apex of the said cone extends a shaft 3, said shaft carrying a series of cutters or blades 4, two of said cutters or blades being bent over the outer face of the cone-shaped mold, as shown at 5, and extending upwardly, carrying heads 6. At the upper end of the said shaft 3 is secured a spiral spring 7, encircling the said shaft and attached to the upper face of the cone, as shown at 8.

The operation of my improved disher is as follows: The cream being dipped in the usual manner, one of the heads 6, being arranged on each side of the handle, is operated toward the same, as shown in dotted lines in Fig. 1 of the drawings. By this operation the spiral spring 7 is contracted. When the head is released, the spiral spring will again return the cutters to their normal position and the cream will become disengaged from the interior walls of the cone-shaped mold, allowing it to be served and dished. The opposite head may be operated away from the handle, as shown in dotted lines of Fig. 3, thereby accomplishing the same result, and the operation of the parts will be repeated, as heretofore described.

The many advantages obtained by the use of my improved device will be readily apparent from the foregoing description, taken in connection with the accompanying drawings, and it will be noted that various changes may be made in the details of construction without departing from the general spirit of my invention.

Having fully described my invention, what I claim as new, and desire to secure by Letters Patent, is—

1. In a disher, the combination of a cone-shaped mold, a handle rigidly secured thereto, a shaft extending through the apex of said cone-shaped mold, cutters attached to the end of said shaft, and a bent-up portion formed on the end of one of said cutters, substantially as described.

2. In a cream-disher, the combination of a cone-shaped mold, a handle rigidly secured thereto, a shaft extending through the apex of said cone, cutters attached to the lower end of said shaft, bent-up portions formed on the ends of said cutters, heads attached to said bent-up portions, and a spring encircling the upper end of said shaft attached to said cone-shaped mold, all parts being arranged and operating substantially as described.

In testimony whereof I affix my signature in the presence of two witnesses.

ARMINDA B. RUSH.

Witnesses:
JOHN NOLAND,
H. C. EVERT.